(12) United States Patent
You et al.

(10) Patent No.: US 8,749,197 B2
(45) Date of Patent: Jun. 10, 2014

(54) BATTERY CHARGING APPARATUS FOR ELECTRIC VEHICLE WITH FIXING MEMBER AND COOLING MECHANISM

(75) Inventors: Peiai You, Shanghai (CN); Gang Liu, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 355 days.

(21) Appl. No.: 13/234,480

(22) Filed: Sep. 16, 2011

(65) Prior Publication Data

US 2012/0326663 A1    Dec. 27, 2012

(30) Foreign Application Priority Data

Jun. 24, 2011    (CN) .......................... 2011 1 0174078

(51) Int. Cl.
     *H02J 7/00*          (2006.01)

(52) U.S. Cl.
     USPC ........................................................ 320/109

(58) Field of Classification Search
     USPC ........................................................ 320/109
     See application file for complete search history.

(56) References Cited

U.S. PATENT DOCUMENTS

| | | | | |
|---|---|---|---|---|
| 7,431,071 | B2 * | 10/2008 | Wenger ........................... | 165/47 |
| 2005/0230086 | A1 * | 10/2005 | Wang et al. ............... | 165/104.33 |
| 2006/0110656 | A1 * | 5/2006 | Moores et al. .................. | 429/83 |
| 2008/0084214 | A1 * | 4/2008 | Hoffman et al. .............. | 324/426 |
| 2008/0265586 | A1 * | 10/2008 | Like et al. ................... | 290/38 R |
| 2010/0327819 | A1 * | 12/2010 | Macdougall ................. | 320/166 |

FOREIGN PATENT DOCUMENTS

| | | |
|---|---|---|
| CN | 201417961 | 3/2010 |
| JP | 4-106890 A | 4/1992 |
| JP | 7-106730 A | 4/1995 |
| TW | 472981 | 1/2002 |

\* cited by examiner

*Primary Examiner* — Arun Williams
(74) *Attorney, Agent, or Firm* — Kirton McConkie; Evan R. Witt

(57) ABSTRACT

A battery charging apparatus for an electric vehicle (EV) or a hybrid electric vehicle (HEV) includes a case chassis, a circuit board and at least one electronic component. The case chassis includes a plurality of side plates, a bottom plate and a receptacle. The circuit board is accommodated within the receptacle of the case chassis. The electronic component includes a passive component body with a plurality of conductive wires and a fixing member for accommodating the passive component body. The conductive wires are electrically connected to the circuit board. The fixing member is fixed on at least one of the side plates and the bottom plate of the case chassis.

22 Claims, 15 Drawing Sheets

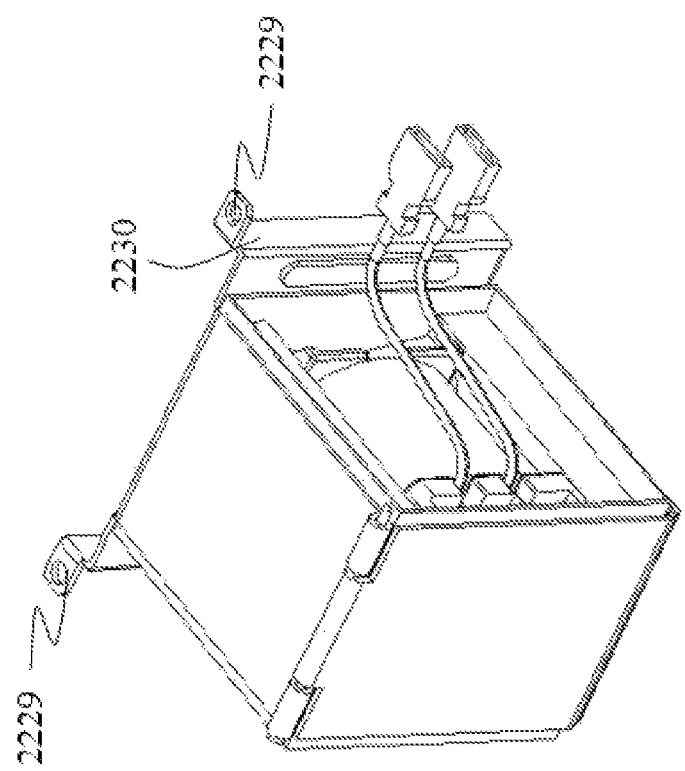

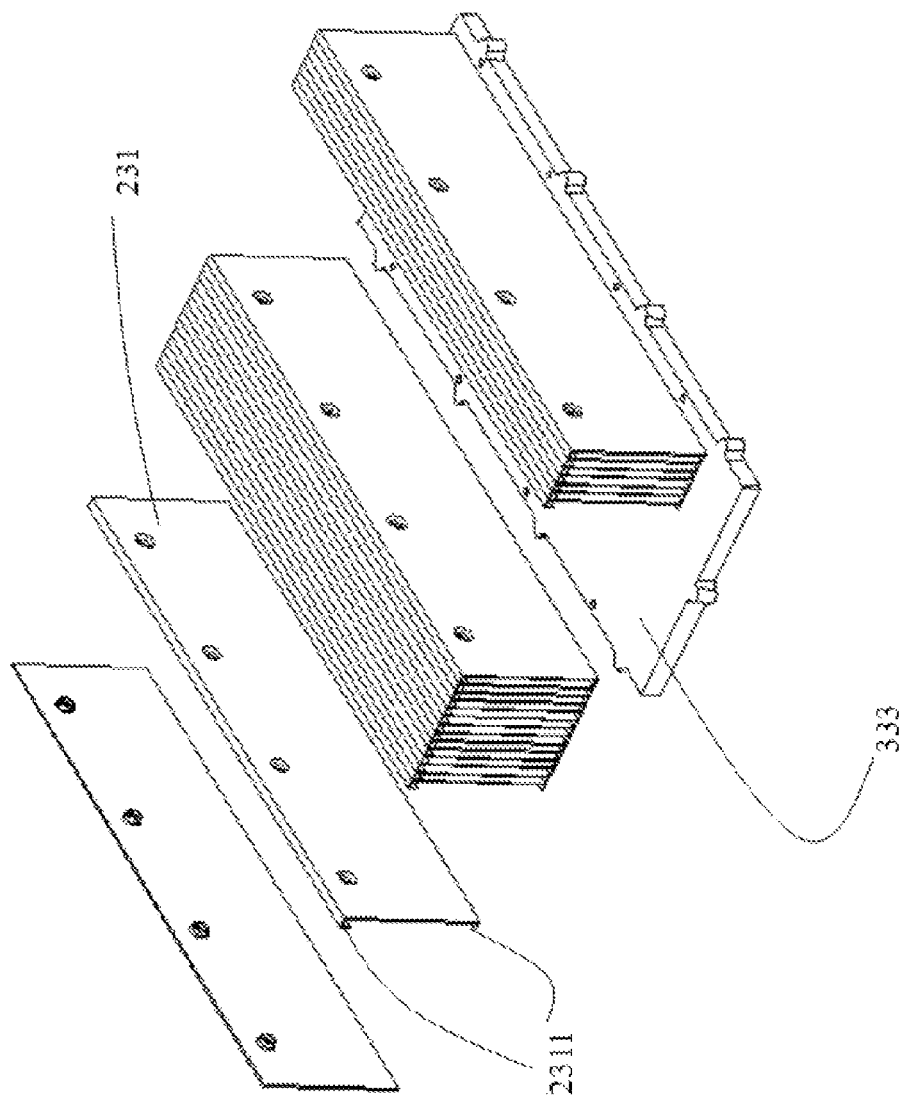

BATTERY CHARGING APPARATUS FOR ELECTRIC VEHICLE WITH FIXING MEMBER AND COOLING MECHANISM

FIELD OF THE INVENTION

The present invention relates to a battery charging system for an electric vehicle (EV) or a hybrid electric vehicle (HEV), and more particularly to a battery charging system for EV or HEV in order to reduce the influence of shock and vibration and increase the heat-dissipating efficiency.

BACKGROUND OF THE INVENTION

Fossil fuels such as petroleum and coal are widely used in automobiles for generating motive force or electrical power. As known, burning fossil fuels causes serious environmental pollution. In addition, fossil fuel depletion may lead to global economic crisis. Gasoline-powered vehicles are widely used for transportation and become indispensable to our daily lives. However, since it is necessary to burn gasoline during the operations of the gasoline-powered vehicles, the problems of using fossil fuels occur.

Consequently, there are growing demands on clean and renewable energy. Recently, electric vehicles (EV) and hybrid electric vehicles (HEV) have been researched and developed. Electric vehicles and hybrid electric vehicles usually use electrical generators to generate electricity. In comparison with the conventional gasoline-powered vehicles and diesel vehicles, the electric vehicles and hybrid electric vehicles are advantageous because of low pollution, low noise, stable energy and better energy utilization. The uses of the electric vehicles and hybrid electric vehicles can reduce carbon dioxide emission in order to decelerate the greenhouse effect.

The electric vehicle or a hybrid electric vehicle has a built-in battery as a stable energy source for providing electric energy to the control circuit or the mechanical power devices of the vehicle. In a case that the electric energy stored in the battery is exhausted, the battery is usually charged by a charging system. In the conventional charging system, many bulky and heavy electronic components (e.g. capacitors, inductors or transformers) are disposed on a system board. That is, the pins of these electronic components are directly inserted into the circuit board and electrically connected with the circuit board. In addition, these heavy components are fixed on the circuit board via soldering between the pins and the PWB.

Since the charging system is disposed within the electric vehicle or the hybrid electric vehicle, the charging system is usually suffered from vibration during the process of operating or running the electric vehicle or the hybrid electric vehicle. If the vibration is too serious, the solder jointers of the electronic components of the charging system are readily broken due to the way of fixing the electronic components, soldering the pins to PWB only. Under this circumstance, the charging system will have malfunction, and thus the maintenance cost will be increased. Moreover, during operations of the charging system, the heat generated by the electronic components should be quickly removed. If the heat fails to be effectively removed, the operating efficiency of the charging system is deteriorated, and the electronic components are possibly damaged. Under this circumstance, the charging system fails to be normally operated. In the current charging system, forced air cooling method is introduced to remove the heat generated by the electronic components. However, the use of the air fails to effective remove the heat of the electronic components or the charging system.

Moreover, in the charging system of the EV or HEV, a flow-guiding structure is arranged between the fan and the fins. Through the flow-guiding structure, the airflow driven by the fan can be introduced into the regions between the fins for dissipating the heat of the charging system. In addition, since the flow-guiding structure may increase the overall volume of the charging system, the charging system fails to be minimized and the fabricating cost thereof is increased.

SUMMARY OF THE INVENTION

The present invention provides a battery charging apparatus for an electric vehicle (EV) or a hybrid electric vehicle (HEV), in which the electronic components are electrically connected with the circuit board through conductive wires. Consequently, during the process of operating or running the electric vehicle or the hybrid electric vehicle, the possibility of damaging the electronic components arising from serious vibration will be reduced and the reliability of connecting the electronic components will be enhanced.

The present invention also provides a battery charging apparatus for an electric vehicle (EV) or a hybrid electric vehicle (HEV), in which the electronic component is fixed on the side plate or the bottom plate of the case chassis through a fixing member. In such way, the passive component body of the electronic component is securely fixed. Moreover, since the fixing member may provide a heat-transferring path and increase the contact area, the thermal resistance between the passive component body and the case chassis is reduced and the heat-dissipating efficacy is enhanced.

The present invention further provides a battery charging apparatus for an electric vehicle (EV) or a hybrid electric vehicle (HEV), in which the flexibility of the layout space within the battery charging apparatus is enhanced. In such way, the overall volume battery charging apparatus can be further reduced.

The present invention further provides a cooling mechanism of a battery charging apparatus for an electric vehicle (EV) or a hybrid electric vehicle (HEV), in which heat pipes are disposed on the fins of the cooling mechanism to increase the heat-dissipating efficacy. In addition, the cooling mechanism may include at least one fan for facilitating removing the heat from the fins. In such way, the cooling mechanism can effectively dissipate the heat of the battery charging apparatus, and the volume and cost of the cooling mechanism are both reduced.

In accordance with an aspect of the present invention, there is provided a battery charging apparatus for an electric vehicle (EV) or a hybrid electric vehicle (HEV). The battery charging apparatus includes a case chassis, a circuit board and at least one electronic component. The case chassis includes a plurality of side plates, a bottom plate and a receptacle. The circuit board is accommodated within the receptacle of the case chassis. The electronic component includes a passive component body with a plurality of conductive wires and a fixing member for accommodating the passive component body. The conductive wires are electrically connected to the circuit board. The fixing member is fixed on at least one of the side plates and the bottom plate of the case chassis.

In accordance with another aspect of the present invention, there is provided a battery charging apparatus for an electric vehicle (EV) or a hybrid electric vehicle (HEV). The battery charging apparatus includes a case chassis, a circuit board, at least one electronic component and a cooling mechanism. The case chassis includes a plurality of side plates, a bottom plate and a receptacle. The circuit board is accommodated within the receptacle of the case chassis. The electronic component includes a passive component body with a plurality of conductive wires and a fixing member for accommodating the passive component body. The conductive wires are electrically connected to the circuit board. The fixing member is fixed on at least one of the side plates and the bottom plate of the case chassis. The cooling mechanism is disposed on an external surface of the bottom plate of the case chassis, and includes a plurality of fins and a plurality of heat pipes. The fins include at least one perforation. The heat pipes are partially penetrated through the perforations of the fins. Each of the heat pipes includes at least one first part and a second part. The at least one first part is penetrated through the at least one perforation. The second part is connected with the at least one first part.

In accordance with a further aspect of the present invention, there is provided a battery charging system for an electric vehicle (EV) or a hybrid electric vehicle (HEV). The battery charging system includes a case chassis and a cooling mechanism. The case chassis has a bottom plate. The cooling mechanism is disposed on an external surface of the bottom plate of the case chassis, and includes a plurality of fins and a plurality of heat pipes. The fins include at least one perforation. The heat pipes are partially penetrated through the perforations of the fins. Each of the heat pipes includes at least one first part and a second part. The at least one first part is penetrated through the at least one perforation. The second part is connected with the at least one first part.

The above contents of the present invention will become more readily apparent to those ordinarily skilled in the art after reviewing the following detailed description and accompanying drawings, in which:

BRIEF DESCRIPTION OF THE DRAWINGS

FIG. 3C is a schematic assembled view illustrating a variant of the electronic component as shown in FIG. 3A;

FIG. 8A is schematic exploded view illustrating a plurality of fins used in another exemplary cooling mechanism of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
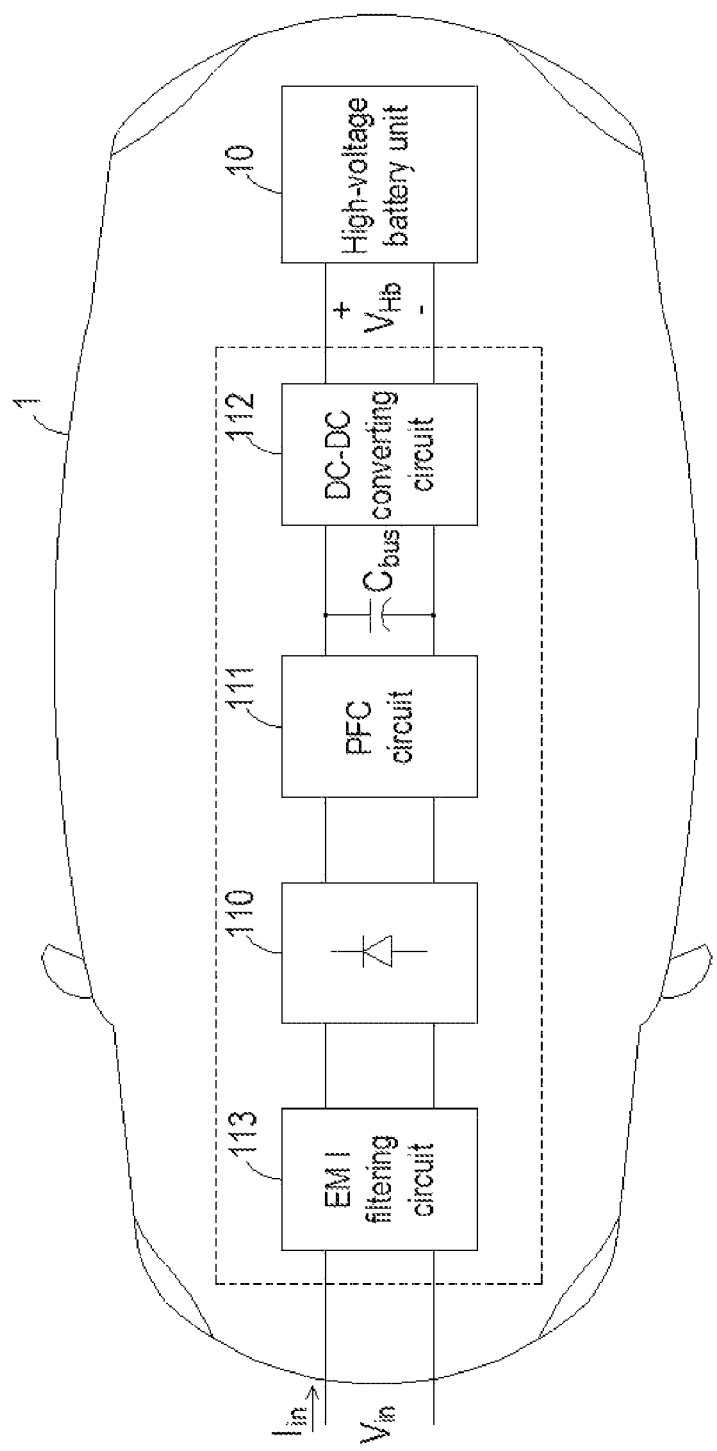
FIG. 1 is a schematic circuit block diagram illustrating the architecture of a battery charging apparatus for an electric vehicle according to an embodiment of the present invention.

FIG. 1 is a schematic circuit block diagram illustrating the architecture of a battery charging apparatus for an electric vehicle according to an embodiment of the present invention. The battery charging apparatus is a high voltage battery charging apparatus installed in an electric vehicle body 1. The high voltage battery charging apparatus is used for receiving electric energy of an AC input voltage $V_{in}$ from an utility power source, and charging a high-voltage battery unit 10. As shown in FIG. 1, the high voltage battery charging apparatus comprises a rectifier circuit 110, a power factor correction (PFC) circuit 111 and a DC-DC converting circuit 112.

In this embodiment, the high voltage battery charging apparatus further comprises an electromagnetic interference (EMI) filtering circuit 113. The EMI filtering circuit 113 is connected to the input side of the rectifier circuit 110 for filtering off the surge and high-frequency noise contained in the AC input voltage $V_{in}$ and the AC input current $I_{in}$. In addition, the use of the EMI filtering circuit 113 can reduce the electromagnetic interference resulted from the switching circuits of the DC-DC converting circuit 112 and the PFC circuit 111. After the surge and high-frequency noise are filtered off by the EMI filtering circuit 113, the AC input voltage $V_{in}$ and the AC input current $I_{in}$ are transmitted to the input side of the rectifier circuit 110. The AC input voltage $V_{in}$ is rectified into a rectified voltage by the rectifier circuit 110.

The PFC circuit 111 is interconnected between the rectifier circuit 110 and the DC-DC converting circuit 112 for increasing the power factor and generating a bus voltage. The DC-DC converting circuit 112 is interconnected between the PFC circuit 111 and the high-voltage battery unit 10 for converting the bus voltage into a charging voltage to charge the high-voltage battery unit 10.

In this embodiment, the DC-DC converting circuit 112 is a non-isolated DC-DC converting circuit. An example of the non-isolated DC-DC converting circuit includes but is not limited to a buck non-isolated DC-DC converting circuit, a buck-boost non-isolated DC-DC converting circuit or a boost non-isolated DC-DC converting circuit. An example of the PFC circuit 111 includes but is not limited to a continuous conduction mode (CCM) boost PFC circuit, a direct coupling modulated bias (DCMB) boost PFC circuit, a buck PFC circuit or a buck-boost PFC circuit. The high-voltage battery unit 10 includes one or more batteries such as lead-acid batteries, nickel-cadmium batteries, nickel-hydrogen batteries, nickel-metal hydride batteries, lithium-ion batteries, or a combination thereof.

Figure 2:
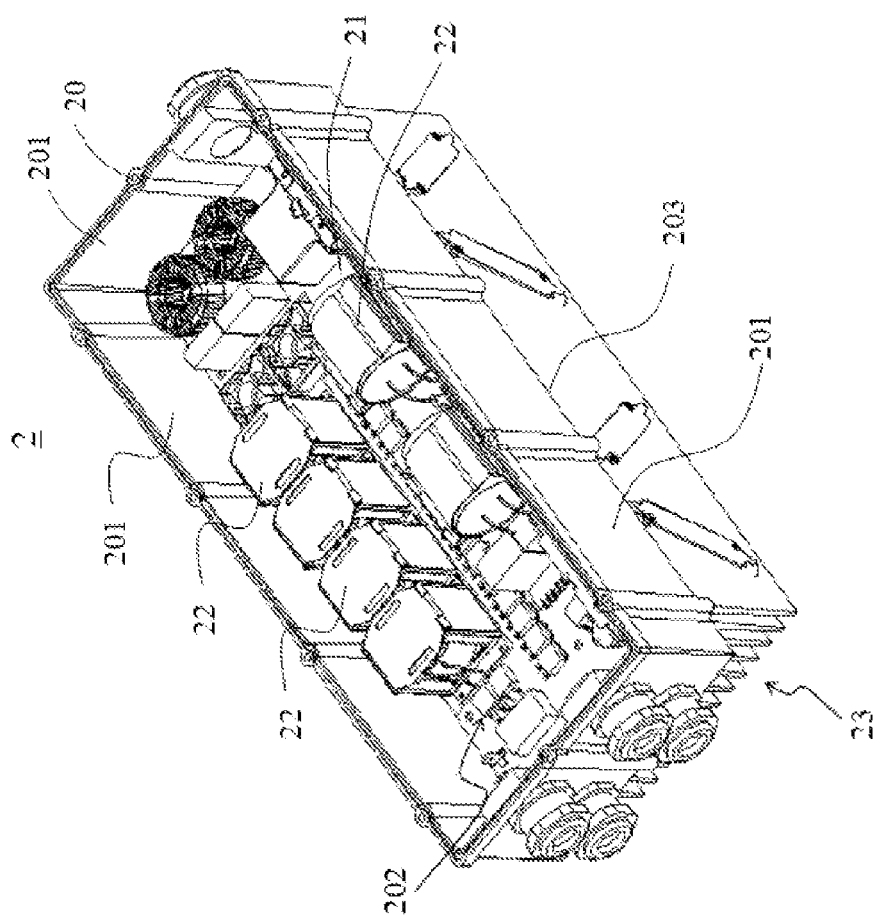
FIG. 2 is a schematic perspective view illustrating an overall configuration of a battery charging apparatus according to an embodiment of the present invention.

FIG. 2 is a schematic perspective view illustrating an overall configuration of a battery charging apparatus according to an embodiment of the present invention. The battery charging apparatus 2 comprises a case chassis 20, a circuit board 21, one or more electronic components 22 and a cooling mechanism 23. The case chassis 20 comprises a plurality of side plates 201, a receptacle 202 and a bottom plate 203. The receptacle 202 is defined by the side plates 201 and the bottom plate 203 for accommodating the circuit board 21. The electronic components 22 are electrically connected to the circuit board 21 and fixed on at least one of the side plates 201 and the bottom plate 203 of the case chassis 20. The cooling mechanism 23 is disposed on the external surface of the bottom plate 203 of the case chassis 20 for dissipating the heat during operation of the battery charging apparatus 2. In some embodiments, the case chassis 20 is made of metallic material (e.g. aluminum). The electronic components 22 are components of the PFC circuit 111 and/or the DC-DC converting circuit 112 and/or the EMI filtering circuit 113 of the battery charging apparatus 2.

Figure 3A:
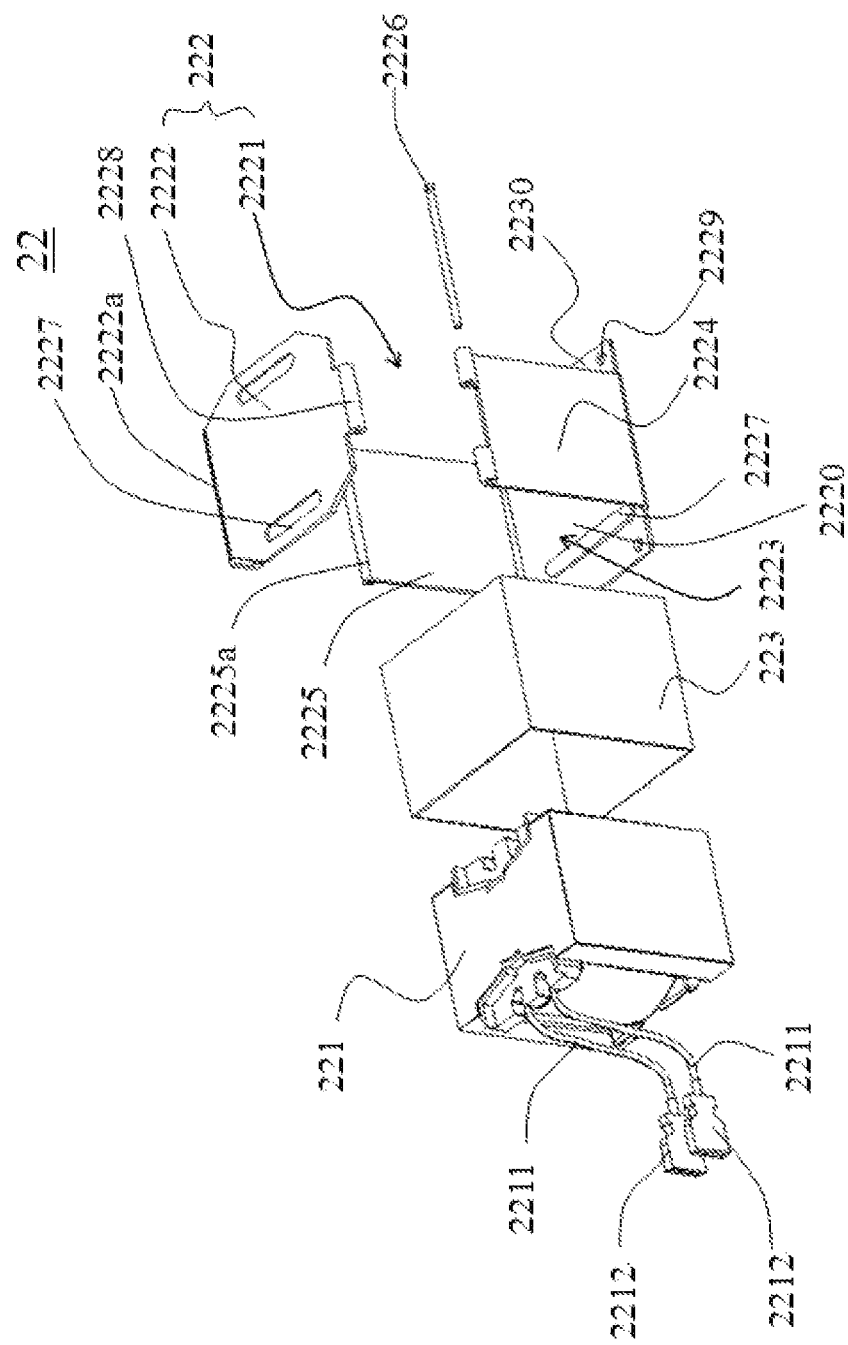
FIG. 3A is a schematic exploded view illustrating an exemplary electronic component used in the battery charging apparatus as shown in FIG. 2.
Figure 3B:
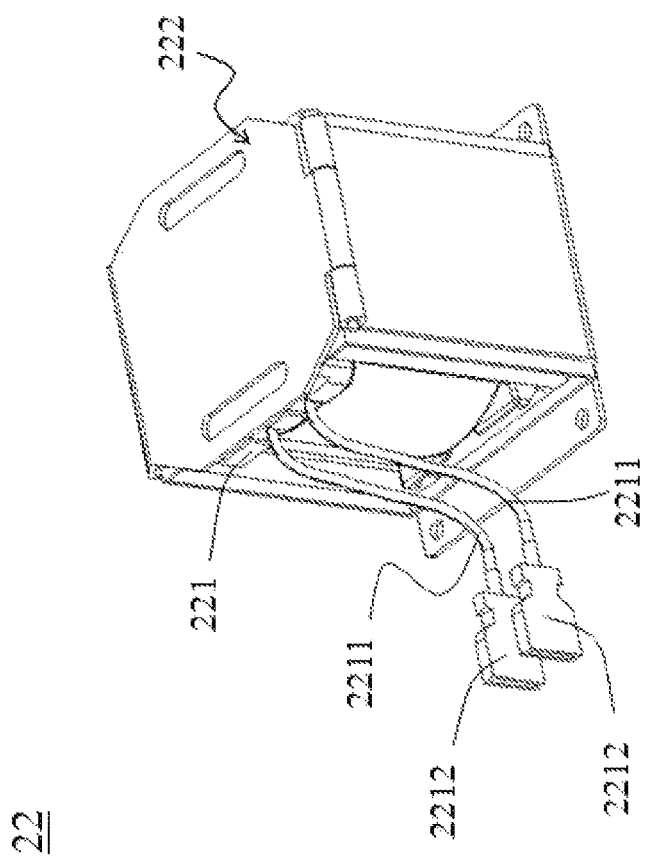
FIG. 3B is a schematic assembled view illustrating the electronic component as shown in FIG. 3A.

FIG. 3A is a schematic exploded view illustrating an exemplary electronic component used in the battery charging apparatus as shown in FIG. 2. The electronic component 22 comprises a passive component body 221 and a fixing member 222. The passive component body 221 comprises a plurality of conductive wires 2211 and a plurality of connecting terminals 2212. The first ends of the connecting terminals 2212 are connected with respective conductive wires 2211. The second ends of the connecting terminals 2212 are connected with respective connecting parts of the circuit board 21 (see FIG. 2). In this embodiment, the passive component body 221 comprises two conductive wires 2211 and two connecting terminals 2212. The conductive wires 2211 are soft or flexible wires. In some embodiments, the passive component body 221 is a transformer, an inductive element (e.g. an inductor) or a capacitive element (e.g. a capacitor). The fixing member 222 is configured for accommodating and fixing the passive component body 221, and fixing the passive component body 221 on the side plate 201 or the bottom plate 203 of the case chassis 20. The fixing member 222 comprises a clipping chassis 2221 and a clipping cover 2222. The clipping chassis 2221 and the clipping cover 2222 are combined together to define a receiving space 2223 for accommodating and fixing the passive component body 221. The electronic component 22 further comprises an insulator 223, which is arranged between the passive component body 221 and the fixing member 222. For assembling the electronic component 22, the insulator 223 is sheathed around the passive component body 221, then the insulator 223 and the passive component body 221 are accommodated within the receiving space 2223 of the fixing member 222, and finally the clipping chassis 2221 and the clipping cover 2222 are combined together. The assembled structure of the electronic component 22 is shown in FIG. 3B. In this embodiment, the clipping chassis 2221 and the clipping cover 2222 of the fixing member 222 are made of high thermally-conductive material (e.g. metallic material).

In this embodiment, the passive component body 221 is a transformer. The clipping cover 2222 of the fixing member 222 is pivotally coupled to the clipping chassis 2221, so that the clipping cover 2222 is rotatable relative to the clipping chassis 2221. As shown in FIG. 3A, the clipping chassis 2221 has a first sidewall 2224 and a second sidewall 2225. The clipping chassis 2221 includes a shaft element 2226 disposed on an edge of the first sidewall 2224. A sleeve part 2228 is formed on an edge of the clipping cover 2222 and configured to couple with the shaft element 2226 of the clipping chassis 2221 so that the clipping cover 2222 is pivotally coupled to the clipping chassis 2221. Under this circumstance, the clipping cover 2222 can be selectively opened or closed by rotating the clipping cover 2222 relative to the clipping chassis 2221. Moreover, a first hooking part 2225a is formed on an edge of the second sidewall 2225 of the clipping chassis 2221.

Corresponding to the first hooking part 2225a, the clipping cover 2222 has a second hooking part 2222a. In a case that the clipping cover 2222 is closed by rotating the clipping cover 2222 relative to the clipping chassis 2221, the first hooking part 2225a and the second hooking part 2222a are engaged with each other. Consequently, the clipping cover 2222 and the clipping chassis 2221 are combined together. In some embodiments, one or more protrusion structures 2227 are optionally formed on the inner surface of the clipping cover 2222 and/or the inner surface of the clipping chassis 2221 for increasing the friction between the passive component body 221 and clipping cover 2222 and/or the clipping chassis 2221. Due to the friction, the passive component body 221 can be securely accommodated and fixed within the receiving space 2223. Consequently, if the electronic component 22 is suffered from vibration, the passive component body 221 is not detached from the fixing member 222. Under this circumstance, the possibility of causing damage of the battery charging apparatus 2 arising from vibration will be minimized.

The clipping chassis 2221 further comprises a fixing part 2229 (e.g. a fixing hole). By tightening a corresponding fastening element (not shown) into the fixing hole 2229 and, the assembled electronic component 22 may be fixed on one of the side plates 201 or the bottom plate 203 of the case chassis 20. In an embodiment, the fixing hole 2229 is a screwing hole, and the fastening element is a screw. In this embodiment, the fixing hole 2229 is located at an extension part 2230 that is extended from any sidewall of the clipping chassis 2221. For example, the extension part 2230 is extended from a third sidewall 2220, which is arranged between the first sidewall 2224 and the second sidewall 2225 (see FIG. 3B). Consequently, the electronic component 22 may be fixed on the bottom plate 203 of the case chassis 20. Alternatively, the location of the fixing hole 2229 may be varied (see FIG. 3C). Consequently, the electronic component 22 may be fixed on the sidewall 201 of the case chassis 20. After the electronic component 22 is fixed on the sidewall 201 or the bottom plate 203 of the case chassis 20, the electronic component 22 are electrically connected with the circuit board 21 through the conductive wires 2211. Consequently, the electronic component 22 can withstand the vibration during the process of operating or running the electric vehicle. Moreover, the fixing member 222 may provide a heat-transferring path and increase the contact area, so that the thermal resistance between the passive component body 221 and the case chassis 20 is reduced. Under this circumstance, the heat-dissipating efficacy will be enhanced. In some embodiments, after the electronic component 22 is fixed on the side plate 201 of the case chassis 20, a gap is formed between the electronic component 22 and the circuit board 21. Since another electronic component may be located within the gap, the flexibility of the layout space within the battery charging apparatus 2 will be enhanced and the overall volume battery charging apparatus 2 can be further reduced.

Figure 4:
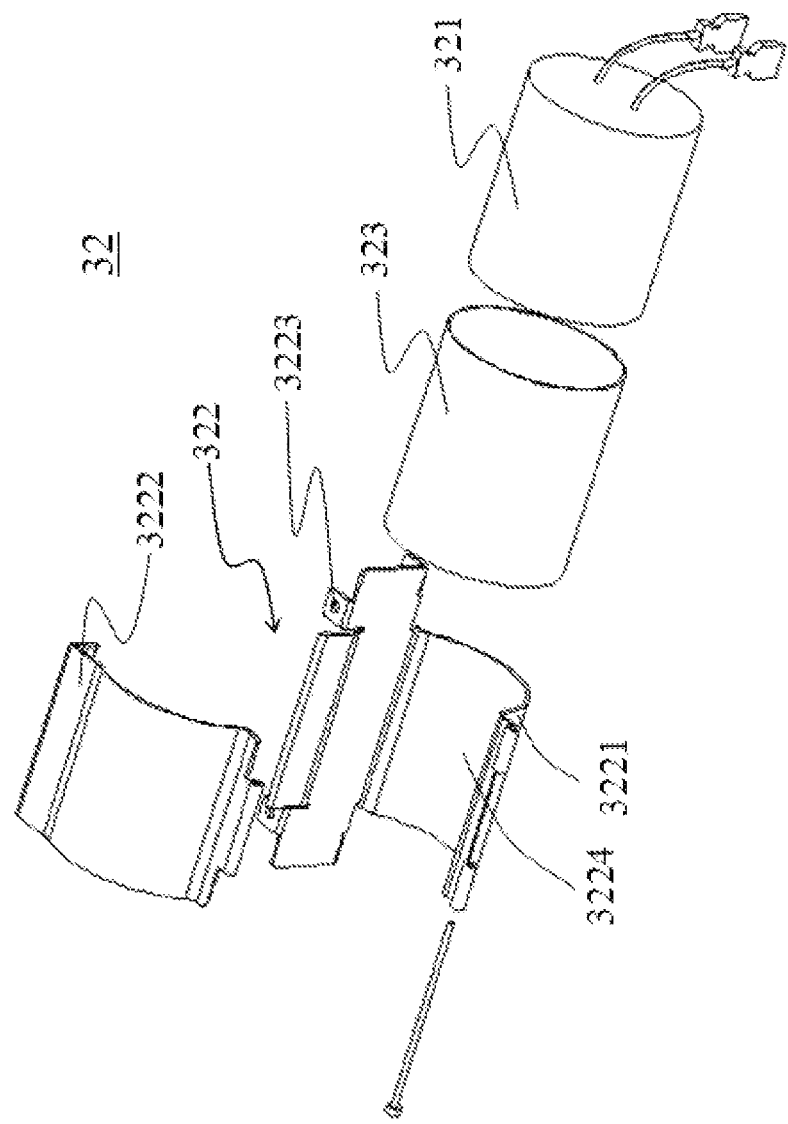
FIG. 4 is a schematic exploded view illustrating another exemplary electronic component used in the battery charging apparatus as shown in FIG. 2.

In some embodiments, the shape of the fixing member and the dimension and profile of the receiving space are fitted with those of the passive component body. FIG. 4 is a schematic exploded view illustrating another exemplary electronic component used in the battery charging apparatus as shown in FIG. 2. In compared with the electronic component of FIG. 3, the clipping chassis 3221 and the clipping cover 3222 of the fixing member 322 are distinguished. As shown in FIG. 4, the clipping chassis 3221 and the clipping cover 3222 are arc-shaped. In addition, the receiving space 3224 defined by the clipping chassis 3221 and the clipping cover 3222 is a cylindrical space for receiving a passive component body 321 (e.g. a capacitor). The other configurations of the electronic component 32 are similar to those illustrated in the above embodiments, and are not redundantly described herein.

Figure 5A:
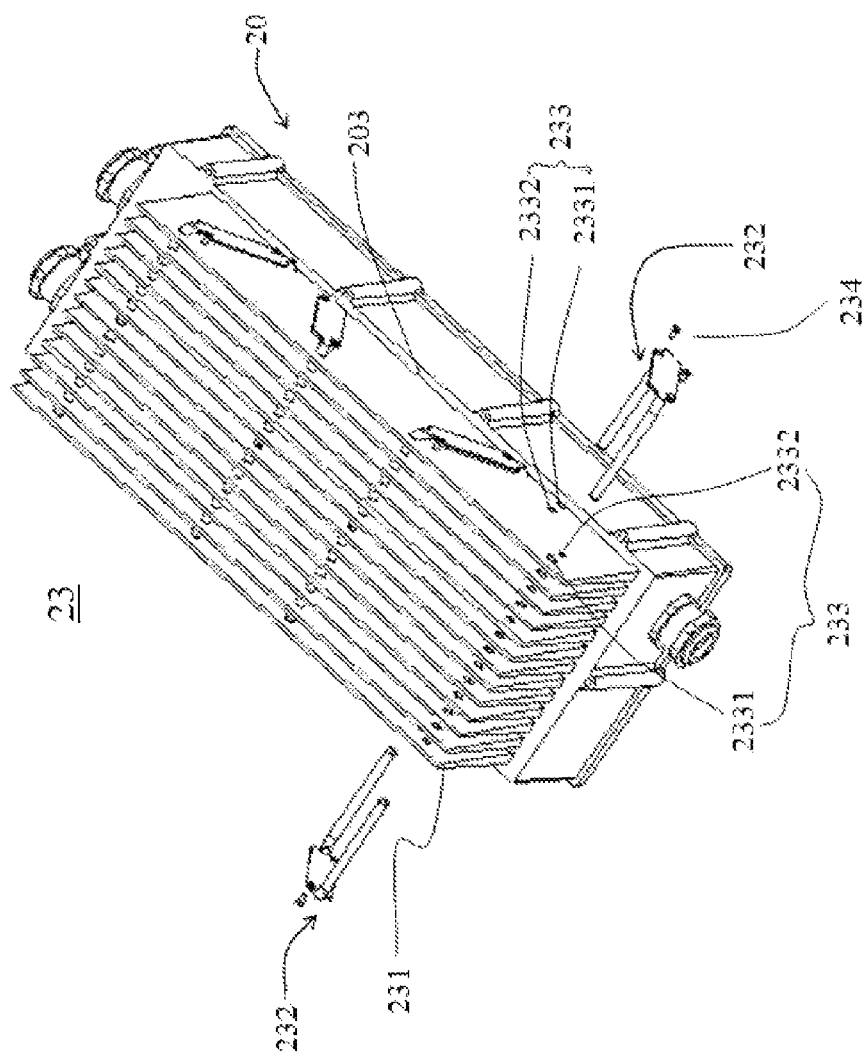
FIG. 5A is a schematic perspective view illustrating a cooling mechanism used in the battery charging apparatus as shown in FIG. 2.
Figure 5B:
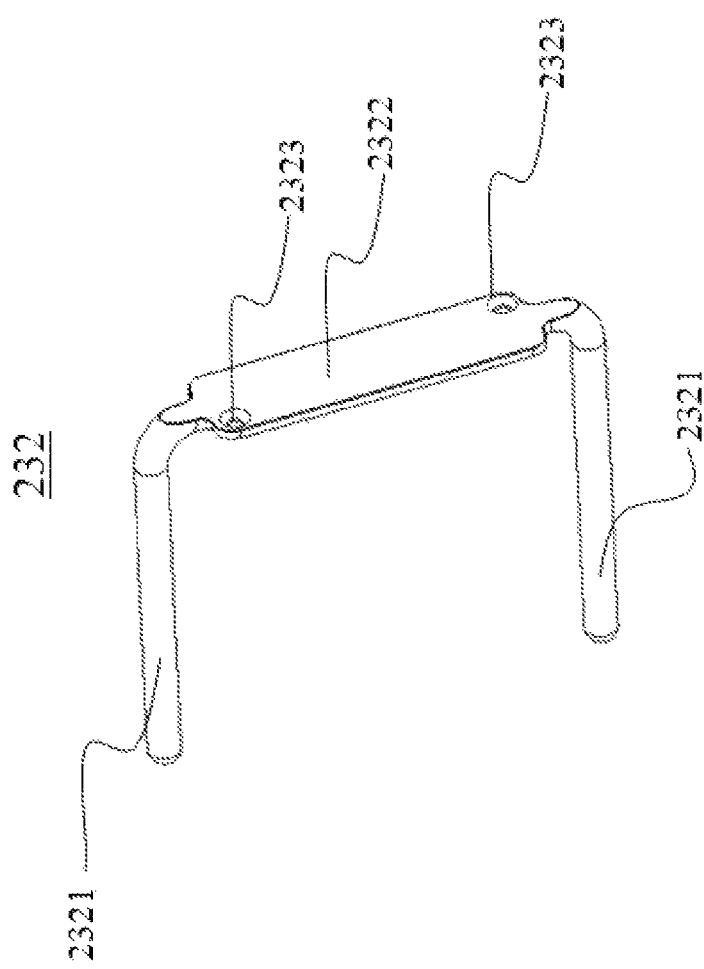
FIG. 5B is a schematic perspective view illustrating a heat pipe of the cooling mechanism of FIG. 5A.

FIG. 5A is a schematic perspective view illustrating an exemplary cooling mechanism used in the battery charging apparatus as shown in FIG. 2. FIG. 5B is a schematic perspective view illustrating a heat pipe of the cooling mechanism of FIG. 5A. The cooling mechanism 23 is disposed on an external surface of the bottom plate 203 of the case chassis 20. In addition, the cooling mechanism 23 comprises a plurality of fins 231 and a plurality of heat pipes 232. In this embodiment, the bottom plate 203 of the case chassis 20 is a cold plate. The fins 231 are disposed on an external surface of the bottom plate 203 of the case chassis 20. Each heat pipe 232 is partially penetrated through the cooling mechanism 231. The fins 231 further comprise a plurality of holes 233. These holes 233 comprise at least one perforation 2331 and at least one fastening hole 2332. The at least one fastening hole 2332 is located at the outermost fin 231. Through the fastening hole 2332, a corresponding heat pipe 232 can be attached and fixed on the fastening hole 2332.

Please refer to FIG. 5B, which is a schematic perspective view illustrating a heat pipe of the cooling mechanism of FIG. 5A. As shown in FIG. 5B, the heat pipe 232 comprises at least one first part 2321 and a second part 2322. In this embodiment, the heat pipe 232 comprises two first parts 2321 and a second part 2322. The first parts 2321 and the second part 2322 are integrally formed. In addition, the two first parts 2321 are vertically extended from both ends of the second part 2322, so that the heat pipe 232 is U-shaped. The second part 2322 is flat and comprises at least one fastening hole 2323. In this embodiment, two fastening holes 2323 are respectively located at both ends of the second part 2322. The uses of the heat pipes 232 can reduce the thermal resistance between the bottom plate 203 of the case chassis 20 and the fins 231, thereby enhancing the heat-conducting efficiency of the fins 231.

Please refer to FIG. 5A again. For fixing the heat pipes 232 on the fins 231, the first parts 2321 of each heat pipe 232 are penetrated through corresponding perforations 2331, and the fastening holes 2323 of the second part 2322 are aligned with the fastening holes 2332 of the fins 231. By penetrating fastening elements 234 (e.g. screws) through corresponding fastening holes 2323 of the second part 2322 and the fastening holes 2332 of the fins 231, the heat pipes 232 are fixed on the fins 231. The heat pipes 232 can reduce the thermal difference between various positions of the cooling mechanism 23. Moreover, since the thermal pipes are securely fixed on the cooling mechanism, the overall volume of the cooling mechanism may be further reduced.

Figure 6A:
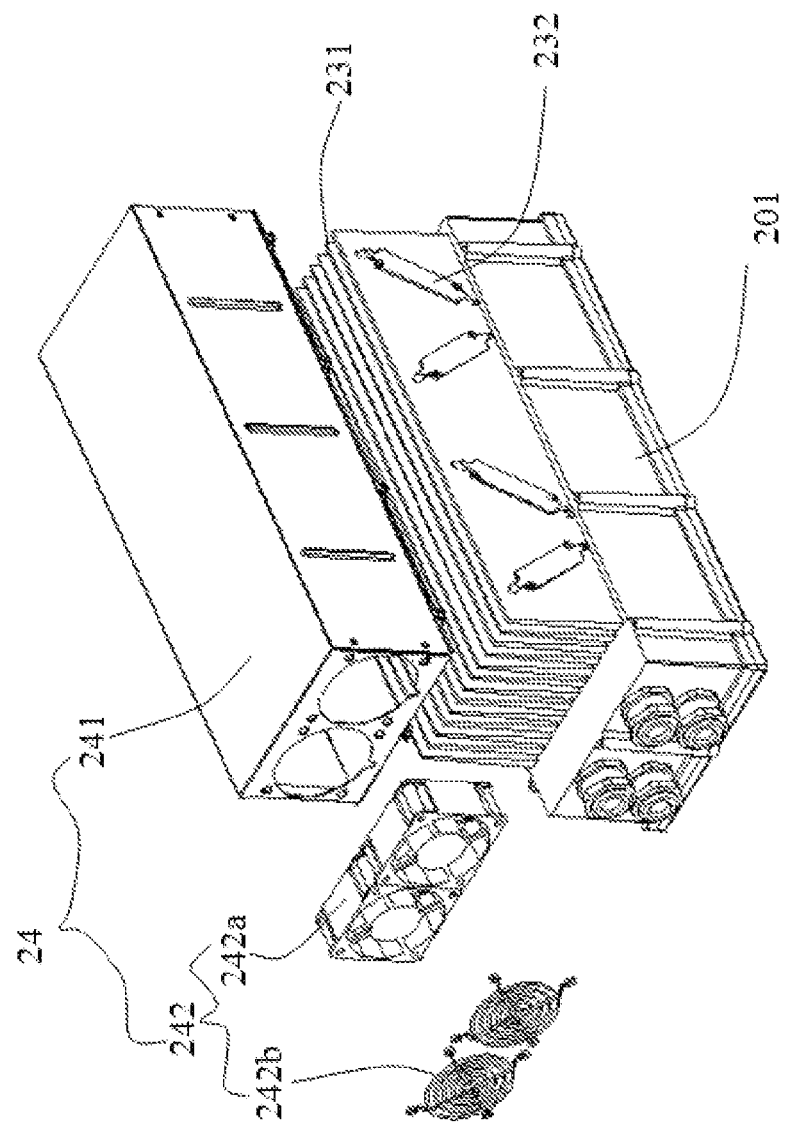
FIG. 6A is a schematic exploded view illustrating another exemplary cooling mechanism used in the battery charging apparatus of the present invention.
Figure 6B:
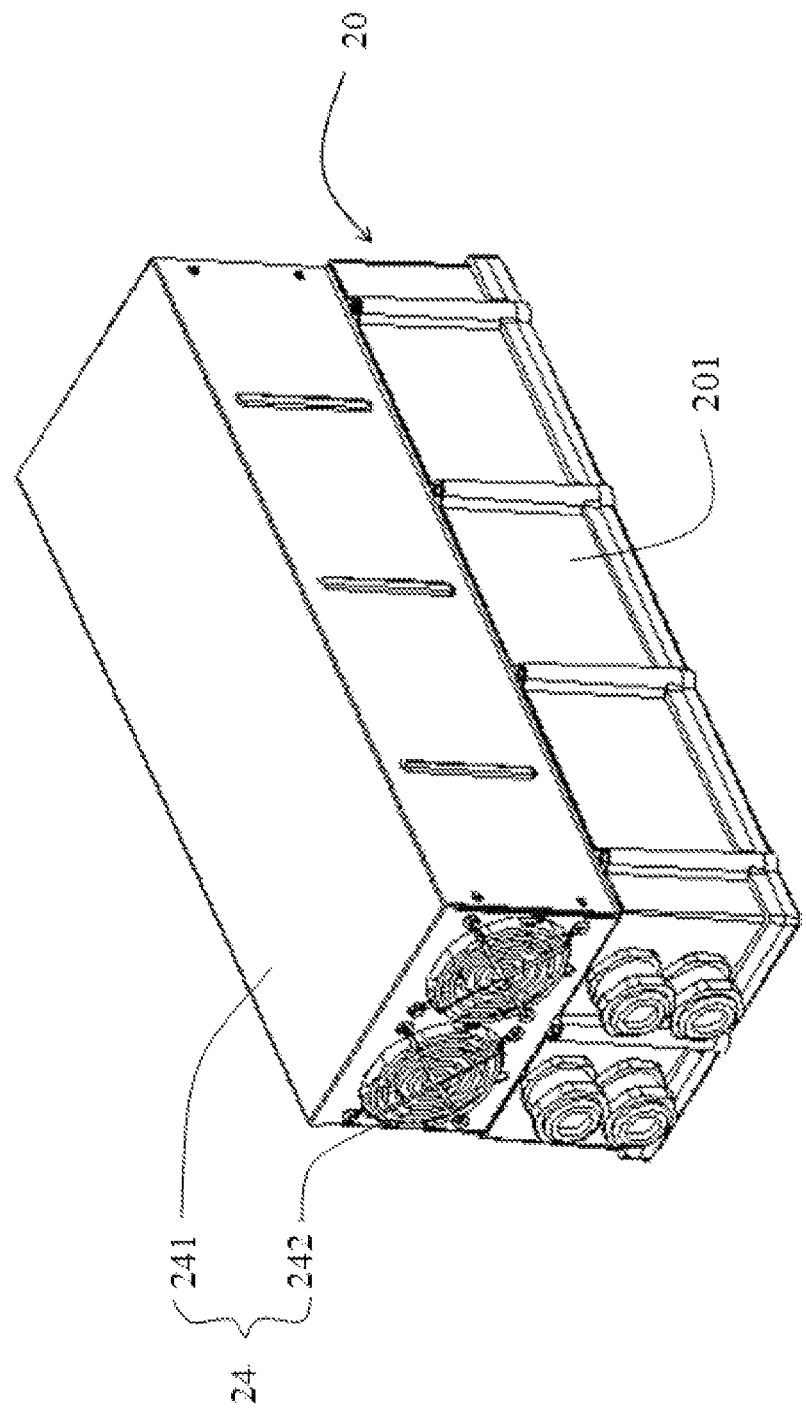
FIG. 6B is a schematic assembled view illustrating the cooling mechanism of FIG. 6A.

FIG. 6A is a schematic exploded view illustrating another exemplary cooling mechanism used in the battery charging apparatus of the present invention. FIG. 6B is a schematic assembled view illustrating the cooling mechanism of FIG. 6A. Please refer to FIGS. 5A, 6A and 6B. The cooling mechanism 23 of the battery charging apparatus 2 further comprises a fan assembly 24. The fan assembly 24 comprises a covering structure 241 and at least one fan 242. The covering structure 241 is disposed on the fins 231. The at least one fan 242 comprises a fan body 242a and a fan guard 242b. The fan guard 242b is located at an airflow inlet of the fan body 242a. The fan body 242a and the fan guard 242b are collectively assembled as the at least one fan 242. Moreover, the at least one fan 242 is embedded into a first side of the covering structure 241. The use of the at least one fan 242 may facilitate removing the heat from the fins 231, thereby enhancing the heat-dissipating efficacy. In this embodiment, the fan assembly 24 comprises the covering structure 241 and two fans 242.

Figure 7:
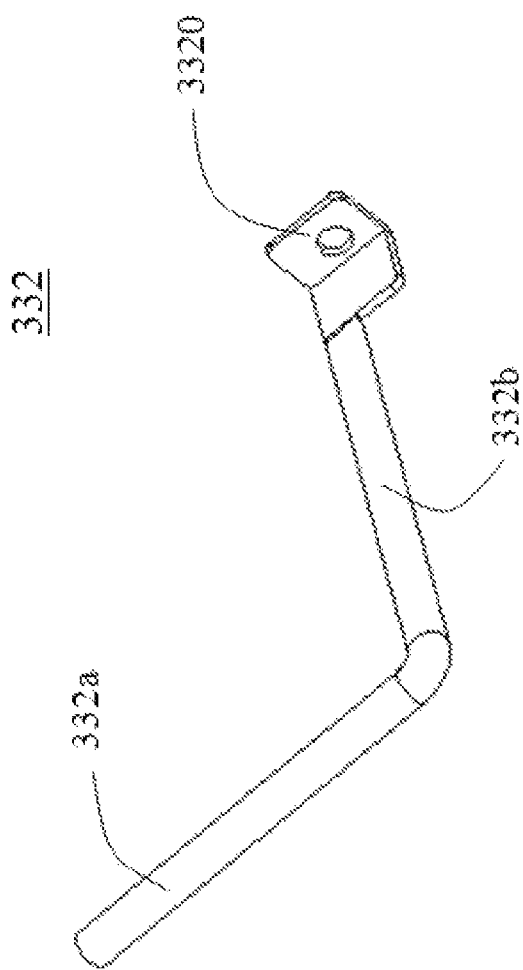
FIG. 7 is a schematic perspective view illustrating another exemplary heat pipe as shown in FIG. 5A.
Figure 8B:
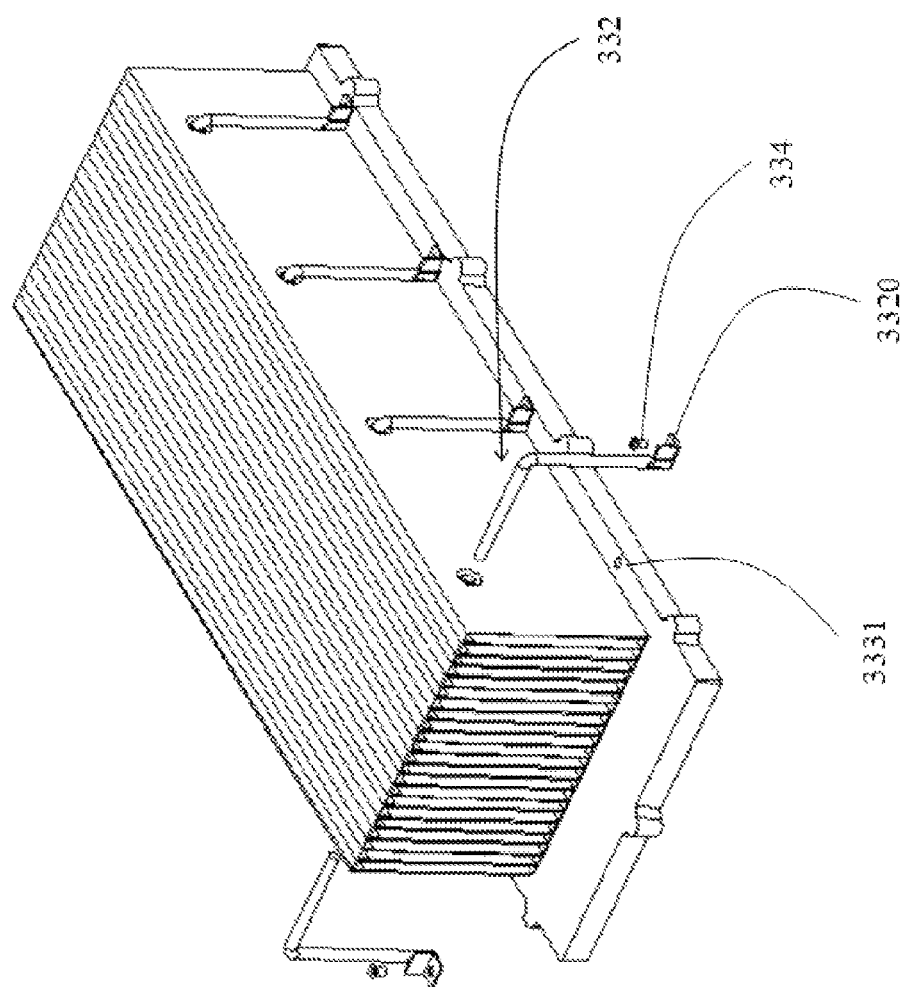
FIG. 8B is a schematic view illustrating the heat pipe of FIG. 7 assembled to the cooling mechanism of FIG. 8A.
Figure 8C:
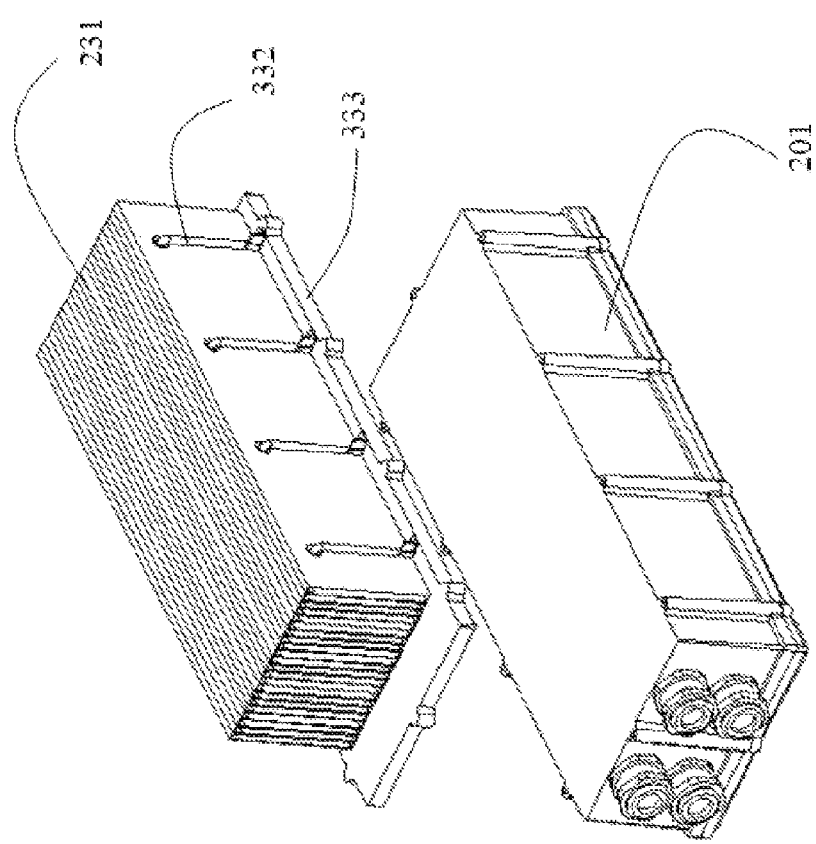
FIG. 8C is a schematic view illustrating the relationship between the cooling mechanism of FIG. 8B and the case chassis.
Figure 8D:
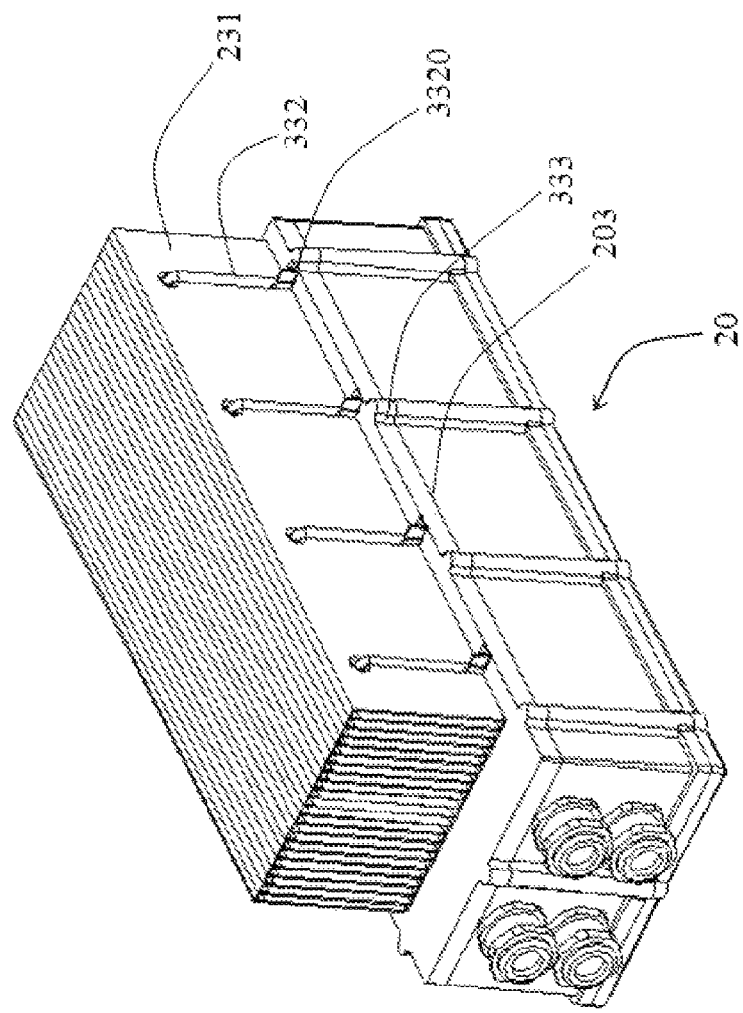
FIG. 8D is a schematic assembled view illustrating a combination of the cooling mechanism of FIG. 8B and the case chassis.

It is noted that numerous modifications of the heat pipe and the cooling mechanism made be made while retaining the teachings of the invention. FIG. 7 is a schematic perspective view illustrating another exemplary heat pipe as shown in FIG. 5A. The heat pipe 332 comprises a first part 332a and a second part 332b. The first part 332a and the second part 332b are integrally formed. In addition, the first part 332a is vertically extended from an end of the second part 332b, so that the heat pipe 332 is substantially L-shaped. FIG. 8A is schematic exploded view illustrating a plurality of fins used in another exemplary cooling mechanism of the present invention. FIG. 8B is a schematic view illustrating the heat pipe of FIG. 7 assembled to the cooling mechanism of FIG. 8A. FIG. 8C is a schematic view illustrating the relationship between the cooling mechanism of FIG. 8B and the case chassis. FIG. 8D is a schematic assembled view illustrating a combination of the cooling mechanism of FIG. 8B and the case chassis. Please refer to FIGS. 8A~8D. Each of the fins 231 has two engaging parts 2311 at bilateral edges thereof. Through the engaging parts 2311, these fins 231 are connected with each other. Consequently, these fins 231 are in parallel with each other, and the overall structure of these fins 231 is vertically connected with a slab 333 (see FIG. 8A). In this embodiment, the slab 333 is a cooling slab. The method of fixing the fins 231 on the slab is well known in the art, and is not redundantly described herein. The first part 332a of the heat pipe 332 is penetrated through the fins 231. A fastening hole 3320 is located at an end of the second part 332b. By penetrating a fastening element 334 through the fastening hole 3320 of the heat pipe 332 and a corresponding fastening hole 3331 of the slab 333, the heat pipe 332 is fixed on the slab 333 (see FIG. 8B). Then, the slab 333 is fixed on the external surface of the bottom plate 203 of the case chassis 20 (see FIGS. 8C and 8D). The way of dissipating heat by the heat pipes 332 is similar to that of the above embodiment, and is not redundantly described herein.

From the above description, the present invention provides a battery charging apparatus for an electric vehicle. The electronic components of the battery charging apparatus are electrically connected with the circuit board through conductive wires. Consequently, during the process of operating or running the electric vehicle or the hybrid electric vehicle, the possibility of damaging the electronic components arising from serious vibration will be reduced and the reliability of connecting the electronic components will be enhanced. Moreover, since the electronic component is fixed on the side plate or the bottom plate of the case chassis through a fixing member, the passive component body of the electronic component is securely fixed. Moreover, since the fixing member may provide a heat-transferring path and increase the contact area, the thermal resistance between the passive component body and the case chassis is reduced and the heat-dissipating efficacy is enhanced. In a case that the electronic component is fixed on the side plate of the case chassis, a gap is formed between the electronic component and the circuit board. Since another electronic component may be located within the gap, the flexibility of the layout space within the battery charging apparatus will be enhanced and the overall volume battery charging apparatus can be further reduced. Moreover, in the cooling mechanism of the battery charging apparatus, the heat pipes are disposed on the fins to increase the heat-dissipating efficacy. In addition, the cooling mechanism may include at least one fan for facilitating removing the heat from the fins. In such way, the cooling mechanism can effectively dissipate the heat of the battery charging apparatus, and the volume and cost of the cooling mechanism are both reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery charging apparatus for an electric vehicle, said battery charging apparatus comprising:
    a case chassis comprising a plurality of side plates, a bottom plate and a receptacle;
    a circuit board accommodated within the receptacle of said case chassis; and
    at least one electronic component comprising a passive component body with a plurality of conductive wires and a fixing member for accommodating said passive component body, wherein said conductive wires are electrically connected to said circuit board, and said fixing member is fixed on at least one of said side plates and said bottom plate of said case chassis.

2. The battery charging apparatus according to claim 1 wherein said electronic component further comprises an insulator, which is arranged between said passive component body and said fixing member.

3. The battery charging apparatus according to claim 1 wherein said passive component body further comprises a plurality of connecting terminals, wherein first ends of said connecting terminals are connected with respective conductive wires, and second ends of said connecting terminals are connected with said circuit board.

4. The battery charging apparatus according to claim 1 wherein said fixing member comprises:
    a clipping chassis;
    a clipping cover, wherein said clipping cover and said clipping chassis are combined together to define a receiving space for accommodating and fixing said passive component body; and
    a fixing part located at said clipping chassis, wherein through said fixing part, said electronic component is fixed on at least one of said side plates and said bottom plate of said case chassis.

5. The battery charging apparatus according to claim 4 wherein said clipping cover is pivotally coupled to said clipping chassis, so that said clipping cover is rotatable relative to said clipping chassis.

6. The battery charging apparatus according to claim 5 wherein said clipping chassis has a first sidewall and includes a shaft element disposed on an edge of said first sidewall, and a sleeve part is formed on an edge of said clipping cover and configured to couple with said shaft element of said clipping chassis.

7. The battery charging apparatus according to claim 4 wherein a first hooking part is formed on an edge of said second sidewall of said clipping chassis, and said clipping cover has a second hooking part corresponding to said first hooking part, wherein said first hooking part and said second hooking part are engaged with each other.

8. The battery charging apparatus according to claim 4 wherein one or more protrusion structures are formed on an inner surface of said clipping cover and/or an inner surface of said clipping chassis.

9. The battery charging apparatus according to claim 4 wherein said fixing part is located at an extension part, which is extended from any sidewall of said clipping chassis.

10. The battery charging apparatus according to claim 4 wherein said clipping chassis and said clipping cover are made of metallic material.

11. A battery charging apparatus for an electric vehicle, said battery charging apparatus comprising:
    a case chassis comprising a plurality of side plates, a bottom plate and a receptacle;
    a circuit board accommodated within the receptacle of said case chassis;
    at least one electronic component comprising a passive component body with a plurality of conductive wires and a fixing member for accommodating said passive component body, wherein said conductive wires are electrically connected to said circuit board, and said fixing member is fixed on at least one of said side plates and said bottom plate of said case chassis; and
    a cooling mechanism disposed on an external surface of said bottom plate of said case chassis, and comprising a plurality of fins and a plurality of heat pipes, wherein said fins comprise at least one perforation, and said heat pipes are partially penetrated through said perforations of said fins, wherein each of said heat pipes comprises at least one first part and a second part, said at least one first part is penetrated through said at least one perforation, and said second part is connected with said at least one first part.

12. A battery charging system for an electric vehicle, said battery charging system comprising:
    a case chassis having a bottom plate; and
    a cooling mechanism disposed on an external surface of said bottom plate of said case chassis, and comprising a plurality of fins and a plurality of heat pipes, wherein said fins comprise at least one perforation, and said heat pipes are partially penetrated through said perforations of said fins, wherein each of said heat pipes comprises at least one first part and a second part, said at least one first part is penetrated through said at least one perforation, and said second part is connected with said at least one first part.

13. The battery charging system according to claim 12 wherein said heat pipes are fixed on a surface of the outermost fin.

14. The battery charging system according to claim 12 wherein said fins comprises at least one fastening hole, which is located at the outermost fin.

15. The battery charging system according to claim 12 wherein said second part of each heat pipe is flat.

16. The battery charging system according to claim 15 wherein said second part of said heat pipe has at least one fastening hole, and said at least one first part and said second part are integrally formed.

17. The battery charging system according to claim 16 wherein said first part of said heat pipe is penetrated through said at least one perforation of said fins, and said at least one fastening hole of said second part is aligned with said at least one fastening hole of said fins.

18. The battery charging system according to claim 17 wherein by penetrating a fastening element through said at least one fastening hole of said second part and said at least one fastening hole of said fins, said heat pipes are fixed on said fins.

19. The battery charging system according to claim 12 wherein said cooling mechanism further comprises a slab, which is fixed on said bottom plate of said case chassis, wherein said fins are connected with said slab.

20. The battery charging system according to claim 19 wherein said heat pipes are fixed on said slab.

21. The battery charging system according to claim 12 wherein said cooling mechanism further comprises a fan assembly, which comprises:
   a covering structure disposed on said fins; and
   at least one fan embedded into a side of said covering structure for facilitating removing heat from said fins.

22. The battery charging system according to claim 21 wherein said fan comprises a fan body and a fan guard, wherein said fan guard is located at an airflow inlet of said fan body.

* * * * *